US007492814B1

(12) United States Patent
Nelson

(10) Patent No.: US 7,492,814 B1
(45) Date of Patent: Feb. 17, 2009

(54) METHOD OF REMOVING NOISE AND INTERFERENCE FROM SIGNAL USING PEAK PICKING

(75) Inventor: Douglas J. Nelson, Columbia, MD (US)

(73) Assignee: The U.S. Government as Represented by the Director of the National Security Agency, Washington, DC (US)

( * ) Notice: Subject to any disclaimer, the term of this patent is extended or adjusted under 35 U.S.C. 154(b) by 798 days.

(21) Appl. No.: 11/151,173

(22) Filed: Jun. 9, 2005

(51) Int. Cl.
*H04B 17/00* (2006.01)

(52) U.S. Cl. ......................... 375/227; 375/260; 381/36; 600/507; 704/206

(58) Field of Classification Search ................. 375/227, 375/295
See application file for complete search history.

(56) References Cited

U.S. PATENT DOCUMENTS

| | | | | |
|---|---|---|---|---|
| 6,175,602 | B1 | 1/2001 | Gustafsson et al. | |
| 6,266,633 | B1 | 7/2001 | Higgins et al. | |
| 6,792,057 | B2 * | 9/2004 | Kabel et al. | 375/346 |
| 6,795,559 | B1 | 9/2004 | Taura et al. | |
| 6,801,889 | B2 | 10/2004 | Walker | |
| 6,826,392 | B2 | 11/2004 | Tsuji et al. | |
| 7,016,739 | B2 * | 3/2006 | Bange et al. | 607/60 |
| 7,085,721 | B1 * | 8/2006 | Kawahara et al. | 704/258 |
| 7,139,338 | B2 * | 11/2006 | Wilson et al. | 375/343 |
| 2002/0173276 | A1 | 11/2002 | Tschirk | |

OTHER PUBLICATIONS

Dogulas J. Nelson, Cross-spectral methods for processing speech, Nov. 2001, J. Acosut. Soc. Am. 110 (5), Pt 1.*

* cited by examiner

*Primary Examiner*—Shuwang Liu
*Assistant Examiner*—Dhaval Patel
(74) *Attorney, Agent, or Firm*—Robert D. Morelli

(57) ABSTRACT

Removing noise and interference from a signal by calculating a joint time-frequency domain of the signal, estimating instantaneous frequencies of the joint time-frequency domain, modifying each estimated instantaneous frequency, if necessary, to correspond to a frequency of the joint time-frequency domain to which it most closely compares, redistributing elements within the joint time-frequency domain according to the modified instantaneous frequencies, computing a magnitude for each element in the redistributed joint time-frequency domain, plotting the results, identifying peak values, eliminating from the redistributed joint time-frequency domain elements that do not correspond to the peak values, identifying noise and interference in the peak values, eliminating the noise and the interference from the redistributed joint time-frequency domain elements, and recovering a signal devoid of noise and interference from the modified redistributed joint time-frequency domain.

12 Claims, 1 Drawing Sheet

METHOD OF REMOVING NOISE AND INTERFERENCE FROM SIGNAL USING PEAK PICKING

FIELD OF INVENTION

The present invention relates, in general, to speech signal processing and, in particular, to noise and interference reduction.

BACKGROUND OF THE INVENTION

A frequently recurring problem in communications is the need to remove noise and interference from a signal. There have been many approaches suggested to address this problem. For stationary narrowband interference, a simple notch filter may be effective. Adaptive notch filters have been suggested to remove narrowband non-stationary interference. For removal of broadband noise from speech, Wiener filter techniques such as spectral subtraction are frequently used.

An adaptive filter can be used to remove single non-stationary narrowband interfering signal from a broadband, or speech, signal. In this process, the frequency of the interfering signal is estimated at each time, and a single estimate of the interfering signal bandwidth is estimated. The received signal is frequency shifted at each time such that the frequency of the interfering signal is constant in the shifted representation. A fixed notch filter is applied to remove the interfering signal, and the filtered signal is frequency shifted to its original frequency. This process can remove a single interfering narrowband signal and it can, in principle, be iterated to remove several interfering signals. However, the primary problem with using an adaptive filter is that the instantaneous frequency of the interference must be accurately estimated at each time. Such estimation is difficult. Furthermore, an adaptive filter cannot be used to remove noise.

In Wiener filtering, or spectral subtraction, components which are dominated by noise are removed from the spectrogram, and the noise-free, or clean, signal is estimated by a pseudo inversion process. Spectral subtraction is the most common enhancement method used in speech processing. In this method, a short time Fourier transform (STFT) is computed. The STFT is a time-frequency representation. STFT components identified as dominated by noise are reduced in magnitude, and a signal whose STFT approximates the modified STFT is computed. The clean signal estimated this way is only an approximate solution because the modified STFT cannot be inverted. In the pseudo inversion process, some ad hoc criterion must be used. Furthermore, spectral subtraction cannot be easily used to remove narrowband interference.

For stationary narrowband interference, a clean signal can be estimated by using a notch filter which is tuned to the interference frequency and bandwidth. A notch filter cannot remove noise or interference whose frequencies change with time.

None of the prior art methods adequately identify and separate signal and non-stationary interference components.

U.S. Pat. No. 6,175,602, entitled "SIGNAL NOISE REDUCTION BY SPECTRAL SUBTRACTION USING LINER CONVOLUTION AND CASUAL FILTERING," discloses a method of reducing noise in a signal by spectral subtraction. The present invention does not use spectral subtraction as does U.S. Pat. No. 6,175,602. U.S. Pat. No. 6,175,602 is hereby incorporated by reference into the specification of the present invention.

U.S. Pat. No. 6,266,633, entitled "NOISE SUPPRESSION AND CHANNEL EQUALIZATION PREPROCESSOR FOR SPEECH AND SPEAKER RECOGNIZERS: METHOD AND APPARATUS," discloses a device for and method of noise suppression that uses blind deconvolution. The present invention does not use blind deconvolution as does U.S. Pat. No. 6,266,633, U.S. Pat. No. 6,266,633 is hereby incorporated by reference into the specification of the present invention.

U.S. Pat. No. 6,795,559, entitled "IMPULSE NOISE REDUCER DETECTING IMPULSE NOISE FROM AN AUDIO SIGNAL," discloses a method of reducing noise by detecting and smoothing the high frequency amplitude of a signal, attenuating the non-smoothed amplitude of the signal, comparing the attenuated amplitude to a threshold, and identifying and removing the noise. The present invention does not smooth the high frequency amplitude of a signal as does U.S. Pat. No. 6,795,559. U.S. Pat. No. 6,795,559 is hereby incorporated by reference into the specification of the present invention.

U.S. Pat. No. 6,801,889, entitled "TIME-DOMAIN NOISE SUPPRESSION," discloses a method of reducing noise by performing a Fourier Transform on the signal to generate a frequency spectrum, performing an Inverse Fourier Transform to simulate a noise signal, and subtracting the simulated noise signal from the time-domain signal. The present invention does not simulate noise using an Inverse Fourier Transform as does U.S. Pat. No. 6,801,889. U.S. Pat. No. 6,801,889 is hereby incorporated by reference into the specification of the present invention.

U.S. Pat. No. 6,826,392, entitled "MULTIPATH NOISE REDUCTION METHOD, MULTIPATH NOISE REDUCER, AND FM RECEIVER," discloses a method of reducing noise by frequency modulating the signal, extracting a high-frequency signal from the modulated signal, generating a noise reduction coefficient from the extracted high-frequency signal, separating the signal into high-frequency and low frequency components, multiplying the high-frequency component by the noise reduction coefficient, and adding the product to the low-frequency component. The present invention does not generate a noise reduction coefficient as does U.S. Pat. No. 6,826,392. U.S. Pat. No. 6,826,392 is hereby incorporated by reference into the specification of the present invention.

U.S. patent application No. 20020173276 A1, entitled "METHOD FOR SUPPRESSING SPURIOUS NOISE IN A SIGNAL FIELD," discloses a method of reducing noise by determining a distribution function of the signal, comparing the distribution to a reference distribution, modifying the components in the signal that differ from the reference distribution, and not modifying the components in the signal that are the same as those in the reference distribution. The present invention does not use a reference distribution as does U.S. patent application No. 20020173276 A1 U.S. patent application No. 20020173276 A1 is hereby incorporated by reference into the specification of the present invention.

SUMMARY OF THE INVENTION

It is an object of the present invention to remove noise and interference from a speech signal.

It is another object of the present invention to remove noise and interference from a speech signal by concentrating a short time Fourier transform (STFT) and estimating a noise-free and interference-free signal by integration.

It is another object of the present invention to remove noise and interference from a speech signal by summing a user-definable set of peak values in the concentrated STFT.

The present invention is a method of removing noise and interference from a speech signal by concentrating a STFT and estimating a noise-free and interference-free signal by integration.

The first step of the method is receiving the signal.

The second step of the method is converting the received signal to the joint time-frequency domain.

The third step of the method is estimating an instantaneous frequency (IF) for each element in the joint time-frequency domain calculated in the second step.

The fourth step of the method is modifying each result of the third step, if necessary, where each IF element is replaced, if necessary, with the discrete frequency of the joint time-frequency domain created in the second step to which it most closely compares in value.

The fifth step of the method is redistributing the elements within the joint time-frequency domain created in the second step according to the IF elements as modified by the fourth step.

The sixth step of the method is computing, for each time, the magnitude of each element of the joint time-frequency domain as redistributed in the fifth step.

The seventh step of the method is plotting the results of the sixth step in a graph as the time-frequency representation of the received signal.

The eighth step of the method is identifying in the plot of the seventh step the maximum, or peak, values.

The ninth step of the method is eliminating from the redistributed joint time-frequency domain those elements that do not correspond to the peak values identified in the eighth step.

The tenth of the method is identifying noise and interference in the result of the eighth step.

The eleventh step of the method is eliminating from the redistributed joint time-frequency domain those elements that correspond to the noise and interference identified in the tenth step.

The twelfth, and last, step of the method is recovering a signal devoid of noise and interference from the redistributed joint time-frequency domain as modified in the eleventh step 11.

DETAILED DESCRIPTION

Figure 1:
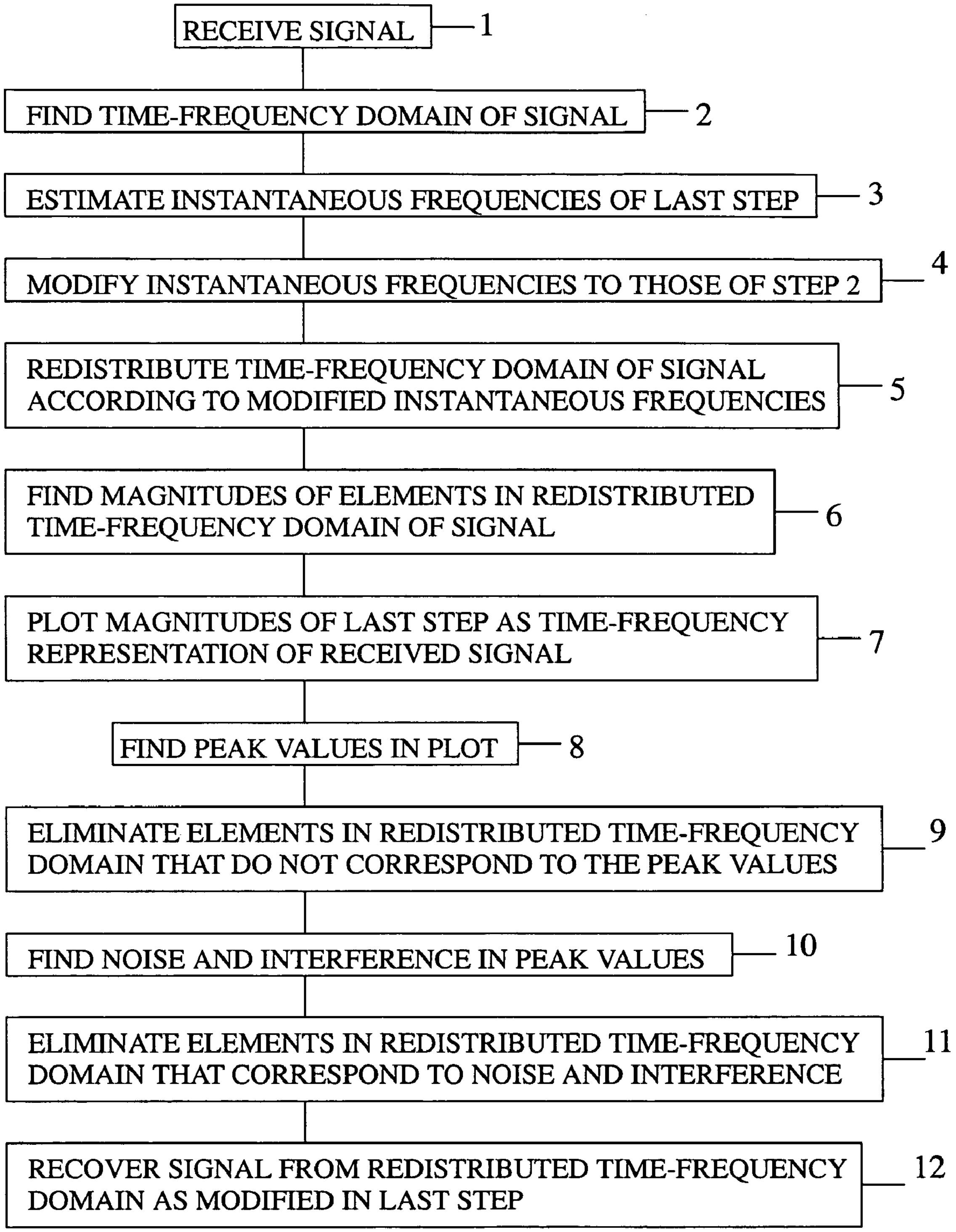
FIG. 1 is a flowchart of the steps of the present invention.

The present invention is a method of removing noise and interference from a signal. The present method is useful in signal coding application, but may be used for any other suitable signal processing application.

FIG. 1 is a flowchart of the method of the present invention.

The first step 1 of the method is receiving the signal. The signal may be in the time or frequency domain. In the preferred embodiment, the received signal is in the time domain.

The second step 2 of the method is converting the received signal to the joint time-frequency domain. In the preferred embodiment, the second step 2 is accomplished by calculating a short-time Fourier transform (STFT) on the received speech signal. An STFT is a known method of forming a matrix of complex values that represent the signal, where the columns (or rows) of the matrix are discrete time and the rows (or columns) of the matrix are discrete frequency. The elements of the matrix may be thought of as representing a complex-valued surface. An STFT is computed by selecting a window size, selecting a window-sized portion of the received signal, and performing a Fourier Transform on the selected portion of the signal. Another window is selected and the steps are repeated. In the preferred embodiment, a subsequently selected window overlaps the previously selected window (e.g., all but one sample in the new window is the same as the previous window). Each element of the resulting STFT matrix is of the following form:

$$x=x+iy,$$

Represented in time and frequency, each element of the matrix is of the following form:

$$z(t,\omega)=x(t,\omega)+iy(t,\omega),$$

The representation in time and phase may be represented in polar form as follows:

$$z(t,\omega)=\sqrt{x^2(t,\omega)+y^2(t,\omega)}\times e^{i\phi(t,\omega)},$$

where $\phi(t,\omega)$ is the argument (arg) of the element, and where $$\arg=\tan^{-1}\left(\frac{y(t,\omega)}{x(t,\omega)}\right).$$

The third step 3 of the method is estimating an instantaneous frequency (IF) for each element in the STFT matrix calculated in the second step 2. The result is an IF matrix, where the rows and columns are the same discrete times are frequencies as those of the STFT matrix, and where each IF is located in the IF matrix at the same time and frequency as that of its corresponding STFT element. In the preferred embodiment, the IFs are estimated for the elements of the STFT matrix by finding the argument for each element in the STFT matrix, forming an argument matrix, and calculating the derivatives of the argument matrix with respect to time. The result is an IF matrix, where an element in the IF matrix is the IF of the corresponding element in the STFT matrix.

The fourth step 4 of the method is modifying each result of the third step 3, if necessary, where each element in the IF matrix is replaced, if necessary, with the discrete frequency of the STFT matrix created in the second step 2 to which it most closely compares in value. For example, if the discrete frequencies in the STFT matrix are 1Hz, 2HZ, . . . , then an IF matrix element of 1.4Hz would be changed to 1Hz, while an IF matrix element of 1.6 would be changed to 2Hz, and an IF matrix element of 2Hz would not be changed.

The fifth step 5 of the method is redistributing the elements within the STFT matrix created in the second step 2 according to the IF matrix as modified by the fourth step 4 by identifying an STFT matrix element's corresponding element in the IF matrix, determining the value of the corresponding IF matrix element, and moving the STFT matrix element within its column to the row that corresponds to the value of the corresponding IF matrix element. If two elements of the STFT matrix map to the same row then sum those STFT elements and place the result at the row. In the following example, an STFT matrix of complex-valued elements, represented by letters of the alphabet for simplicity, will be remapped according to a modified IF matrix. The columns of the STFT matrix are in time (i.e., 1-4 msecs.), and its rows are in frequency (i.e., 1-4 Hz.). Each element in the modified IF matrix corresponds to a column value in the STFT matrix.

| | 1 msec. | 2 msec. | 3 msec. | 4 msec. |
|---|---|---|---|---|
| | | STFT Matrix | | |
| 1 Hz. | A | E | I | M |
| 2 Hz. | B | F | J | N |
| 3 Hz. | C | G | K | O |
| 4 Hz. | D | H | L | P |
| | | Modified IF Matrix | | |
| 1 Hz. | 2 | 3 | 2 | 3 |
| 2 Hz. | 4 | 3 | 2 | 3 |
| 3 Hz. | 2 | 1 | 4 | 1 |
| 4 Hz. | 4 | 1 | 4 | 1 |
| | | Remapped STFT Matrix | | |
| 1 Hz. | | G + H | | O + P |
| 2 Hz. | A + C | | I + J | |
| 3 Hz. | | E + F | | M + N |
| 4 Hz. | B + D | | K + L | |

The result of the fifth step 5 is a novel time-frequency representation. When applied to a multi-component signal which has linearly independent components and which are separable, the method produces a time-frequency representation in which the value of each signal component is distributed, or concentrated, along the component's instantaneous frequency curve in the time-frequency plane. The concentrated STFT is a linear representation, free of cross-terms, which plagued the prior art methods, and having the property that signal and interference components are easily recognized because their distributions are more concentrated in time and frequency. A plot of the remapped matrix is necessary to see that the elements have been so remapped. The following steps result in such a plot.

The sixth step 6 of the method is computing, for each time, the magnitudes of each element in the redistributed STFT matrix of step (e). The result is a matrix of magnitudes, where the elements of the magnitude matrix map to the element in the redistributed matrix to which the magnitudes correspond.

The seventh step 7 of the method is plotting the results of the sixth step 6 in a graph as the time-frequency representation of the received signal, where one axis is time, and the other axis is frequency. The result is a focused representation of each signal component of the received signal, where the phase information of the received signal is retained. Prior art methods do not retain such phase information. The components of the signal may include the intended signal, random noise, and interference (i.e., one or more unintended periodic signal).

The eighth step 8 of the method is identifying in the plot of the seventh step 7 a user-definable range of maximum, or peak, values.

The ninth step 9 of the method is eliminating from the redistributed joint time-frequency domain those elements that do not correspond to the peak values identified in the eighth step 8. Elements are identified in the magnitude matrix computed in the sixth step 6 that are not associated with the peak values. Then, the elements in the redistributed joint time-frequency domain that do not correspond to the peak values are eliminated (i.e., either zeroed out or removed). Zeroing a value maintains the surface scope of the original signal. Removing a value reduces the number of elements that must be processed and, therefore, provides greater computational efficiency. The result of the ninth step 9 is a representation of the signal components of the received signal as the peak values of the redistributed joint time-frequency domain.

The tenth step 10 of the method is identifying noise and interference in the result of the eighth step 8. Noise and interference is identified by comparing the magnitudes of the result of the eighth step 8 to a user-defined threshold. Values lower than the threshold are noise, and values above the threshold that exhibit periodic signal behavior and are empirically determined to be unrelated to the intended signal are interference.

The eleventh step 11 of the method is eliminating from the redistributed joint time-frequency domain those elements that correspond to the noise and interference identified in the tenth step 10. Elements are identified in the magnitude matrix computed in the sixth step 6 that are associated with the noise and interference. Then, the elements in the redistributed joint time-frequency domain that correspond to the noise and interference are eliminated (i.e., either zeroed out or removed). The result of the eleventh step 11 is a representation of the signal components of the received signal as the peak values of the redistributed joint time-frequency domain without noise or interference.

The twelfth, and last, step 12 of the method is recovering a signal devoid of noise and interference from the redistributed joint time-frequency domain as modified in the eleventh step 11. The twelfth step 12 is accomplished by summing each column or row, whichever represents discrete time, in the redistributed joint time-frequency domain as modified by the eleventh step 11 and listing the results, in sequence, as the received signal devoid of noise and interference. In the example above, the columns of the remapped STFT matrix are indexed in time, while the rows are indexed in frequency. In the example, the columns would be summed.

What is claimed is:

1. A method of removing noise and interference from a signal, comprising the steps of:

a) receiving the signal;

b) calculating a joint time-frequency domain of the received signal, where the joint time-frequency domain of the received signal includes elements that represent the received signal;

c) estimating instantaneous frequencies of the joint time-frequency domain;

d) modifying each estimated instantaneous frequency, if necessary, to correspond to a frequency of the joint time-frequency domain to which it most closely compares;

e) redistributing the elements within the joint time-frequency domain according to the estimated instantaneous frequencies as modified; and f) computing a magnitude for each element in the joint time-frequency domain as redistributed;

g) plotting the results of the step (f) as the time-frequency representation of the received signal;

h) identifying peak values in the plot of step (g);

i) eliminating from the redistributed joint time-frequency domain elements that do not correspond to the peak values identified in step (h);

j) identifying noise and interference in the peak values identified in step (h);

k) eliminating from the redistributed joint time-frequency domain elements that correspond to the noise and the interference identified in step (j); and l) recovering a signal devoid of the noise and the interference from the redistributed joint time-frequency domain as modified in step (k).

2. The method of claim 1, wherein the step of receiving a signal, is comprised of receiving a signal, where the signal includes an intended signal, at least on signal component selected from the group of signal components consisting of an interfering signal, and the noise.

3. The method of claim 1, wherein the step of calculating a joint time-frequency domain of the received signal is comprised of the step of calculating a short-time Fourier Transform of the signal received in step (a), where the result is in matrix form, where rows and columns represent discrete frequencies and times in a user-definable manner.

4. The method of claim 3, wherein the step of calculating a short-time Fourier Transform is comprised of selecting a window-sized portion of the received signal, performing a Fourier Transform on the selected of the received signal, selecting a new window, where the next window overlaps a user-definable amount with the window selected just prior to the next window, selecting a new portion of the received window in accordance with the next window selected, performing a Fourier Transform on the next portion of the received signal, and repeating these steps until the entire received signal has been processed.

5. The method of claim 3, wherein the step of estimating instantaneous frequencies of the joint time-frequency domain is comprised of the step of estimating instantaneous frequencies of the short-time Fourier Transform calculated in step (b).

6. The method of claim 5, wherein the step of estimating instantaneous frequencies of the short-time Fourier Transform is comprised of the steps of:

(a) determining arguments for each element in the short-time Fourier Transform matrix;

(b) forming an argument matrix from the results of step (a), where each element in the argument matrix corresponds to the element in the short-time Fourier Transform matrix from which the argument was determined;

(c) calculating a derivative of the argument matrix; and (d) forming an instantaneous frequency matrix from the results of step (c), where each element in the instantaneous frequency matrix corresponds to the element in the argument matrix from which the instantaneous frequency matrix element was derived.

7. The method of claim 3, wherein the step of modifying each estimated instantaneous frequency, if necessary, to correspond to a frequency of the joint time-frequency domain calculated in step (b) to which it most closely compares is comprised of the step of modifying each instantaneous frequency, if necessary, to closest discrete frequency of the short-time Fourier Transform of step (b).

8. The method of claim 3, wherein the step of redistributing the elements within the joint time-frequency domain according to the instantaneous frequencies as modified in step (d) is comprised of the step of redistributing the elements within the short-time Fourier Transform according to the instantaneous frequencies.

9. The method of claim 8, wherein the step of redistributing the elements within the short-time Fourier Transform according to the instantaneous frequencies is comprised of the steps of:

(a) identifying, for each element in the short-time Fourier Transform, the instantaneous frequency that corresponds position-wise to the element in the short-time Fourier Transform;

(b) identifying the value of the identified instantaneous frequency; and (c) moving the corresponding element in the short-time Fourier Transform to a location within its matrix column that corresponds to the identified value of the corresponding instantaneous frequency, summing all of the short-time Fourier Transform elements that map to a same location.

10. The method of claim 1, wherein the step of eliminating from the redistributed joint time-frequency domain elements that do not correspond to peak values identified in step (h) is comprised of the steps of:

(a) identifying elements in the magnitudes computed in step (f) that are not associated with the peak values; and (b) eliminating the elements in the redistributed joint time-frequency domain that do not correspond to the identified magnitudes.

11. The method of claim 1, wherein the step of identifying noise and interference in the peak values identified in step (h) is comprised of the steps of:

(a) identifying elements in the magnitude computed in step (f) that are associated with the peak values that are below a user-definable threshold; and (b) identifying elements in the magnitudes computed in step (f) that are associated with the peak values that exhibit period signal behavior and are empirically determined to be the interference.

12. The method of claim 3, wherein the step of recovering a signal devoid of noise and interference from the redistributed joint time-frequency domain as modified in step (i) is comprised of the steps of:

(a) summing the matrix axis that represents discrete time in the redistributed joint time-frequency domain as modified by step (i); and (b) listing results of step (b), in sequence, as the received signal devoid of the noise and the interference.

* * * * *